United States Patent
Kawasaki et al.

(10) Patent No.: US 9,227,380 B2
(45) Date of Patent: Jan. 5, 2016

(54) LAMINATED BODY AND VULCANIZATE THEREFOR

(75) Inventors: Takashi Kawasaki, Ichihara (JP); Takashi Sunada, Ichihara (JP); Shogo Hagiwara, Ichihara (JP); Yasushi Abe, Itoigawa (JP); Toshiaki Miyauchi, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 151 days.

(21) Appl. No.: 13/702,247

(22) PCT Filed: Feb. 28, 2011

(86) PCT No.: PCT/JP2011/054470
§ 371 (c)(1),
(2), (4) Date: Dec. 27, 2012

(87) PCT Pub. No.: WO2011/155236
PCT Pub. Date: Dec. 15, 2011

(65) Prior Publication Data
US 2013/0095328 A1 Apr. 18, 2013

(30) Foreign Application Priority Data
Jun. 9, 2010 (JP) .................................. 2010-132347

(51) Int. Cl.
| B32B 7/10 | (2006.01) |
| B32B 25/04 | (2006.01) |
| B32B 25/14 | (2006.01) |
| B32B 1/08 | (2006.01) |

(52) U.S. Cl.
CPC . *B32B 25/14* (2013.01); *B32B 7/10* (2013.01); *B32B 25/042* (2013.01); *B32B 1/08* (2013.01); *B32B 2250/248* (2013.01); *Y10T 428/3154* (2015.04)

(58) Field of Classification Search
None
See application file for complete search history.

(56) References Cited

U.S. PATENT DOCUMENTS

| 4,975,139 A | 12/1990 | Sugimoto | |
| 5,508,355 A * | 4/1996 | Toda et al. | ..................... 525/340 |
| 6,096,428 A | 8/2000 | Jing et al. | ..................... 428/421 |

(Continued)

FOREIGN PATENT DOCUMENTS

| AU | 2004202463 A1 | 2/2005 |
| CN | 1572822 A | 2/2005 |

(Continued)

OTHER PUBLICATIONS

European Search Report dated Aug. 4, 2014 issued European Application No. 11792194.0.

(Continued)

*Primary Examiner* — Ramsey Zacharia
(74) *Attorney, Agent, or Firm* — Stein IP, LLC

(57) ABSTRACT

Provided is a laminate having elastomer layers tightly bonded to each other.
The laminate according to the present invention 1 has an acrylic elastomer layer 11 and a fluorine elastomer layer 12 that are bonded to each other. The acrylic elastomer layer 11 is made of an acrylic elastomer composition having an epoxy group-containing acrylic elastomer and an onium salt added and the fluorine elastomer layer 12 is made of a fluorine elastomer composition having a fluorine elastomer and a polyol crosslinking agent added. In the laminate 1, the elastomer layers are bonded tightly to each other even without any surface treatment.

2 Claims, 1 Drawing Sheet

(56) References Cited

U.S. PATENT DOCUMENTS

| | | | |
|---|---|---|---|
| 2008/0107905 A1 | 5/2008 | Odagawa et al. | |
| 2009/0263603 A1 | 10/2009 | Ota et al. | 428/36.9 |
| 2010/0323141 A1* | 12/2010 | Kawasaki et al. | 428/36.9 |

FOREIGN PATENT DOCUMENTS

| | | | |
|---|---|---|---|
| CN | 101448895 A | 6/2009 | |
| EP | 1 201 704 A2 | 5/2002 | |
| JP | S 61-169243 A | 7/1986 | |
| JP | 1-320153 | 12/1989 | |
| JP | 3-67637 | 3/1991 | |
| JP | 4-284241 A | 10/1992 | |
| JP | 6-79828 | 3/1994 | |
| JP | 2002-59486 | 2/2002 | |
| JP | 2009-234216 | 10/2009 | |
| JP | 2010-42669 | 2/2010 | |
| JP | 2010/42669 A | 2/2010 | |
| WO | WO 2006-035892 | 4/2006 | |
| WO | WO 2008/139967 A1 | 11/2008 | |
| WO | WO 2009099113 A1 * | 8/2009 | |

OTHER PUBLICATIONS

E.Lauretti, L.Gargani, "Structure of Acrylic Acid Elastomer", The academic journal title etc.: Synthetic Rubber Industry; the S1 period; pp. 238-248, Dec. 31, 1990.

* cited by examiner

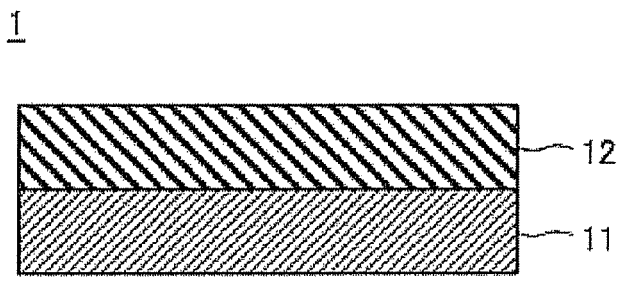

US 9,227,380 B2

LAMINATED BODY AND VULCANIZATE THEREFOR

CROSS-REFERENCE TO RELATED APPLICATIONS

This application is a national stage application of PCT JP/2011/054470, filed Feb. 28, 2011, which claims the benefit of Japanese Application No. 2010-132347, filed Jun. 9, 2010, in the Japanese Intellectual Property Office, the disclosures of which are incorporated herein by reference.

BACKGROUND OF THE INVENTION

1. Field of the Invention

The present invention relates to a laminate of elastomers.

2. Description of the Related Art

Acrylic elastomers and vulcanized products thereof, which are superior in physical properties such as heat-aging resistance, oil resistance, mechanical properties and compression set characteristics, have been used widely, for example, as the materials for hose parts, sealing parts and antivibration rubber parts in automobile engine rooms.

Under recent regulations tightening exhaust gas, mandating increases in engine output and others, there is a demand for parts with higher heat-aging resistance.

To solve the problems above and to improve the reliability of rubber parts, it is conceivable to use fluorine elastomers that are higher in durability than acrylic elastomers. However, fluorine elastomers, which are lower in low-temperature resistance and also expensive, are not ideal materials particularly for auto parts that demand cost-effectiveness and reliability simultaneously.

For example, Patent Documents 1 to 4 below disclose laminates of a fluorine elastomer layer and an acrylic elastomer layer. It is possible to raise the durability of a conventional material substantially by laminating a fluorine elastomer on the region thereof where there is truly a problem in durability.

An important requirement demanded when a laminate is produced from fluorine and acrylic elastomers includes bonding strength between these layers. Because low bonding strength between them impairs reliability of the laminate, it is extremely important to increase the bonding strength between them to obtain an inexpensive laminate higher in durability.

For that reason, the surface of the fluorine elastomer is subjected, for example, to surface-treatment with a metal sodium solution (see, for example, Patent Document 1), discharge treatment (see, for example, Patent Document 2), or plasma treatment (see, for example, Patent Document 3) for improvement of the bonding strength with an elastomer molded in a layer shape. It is also known that it is possible by using a particular kind of fluorine elastomer to improve the bonding strength between a fluorine elastomer layer and a non-fluorine elastomer layer (see, for example, Patent Document 4).

CITATION LIST

Patent Documents

[Patent Document 1] Japanese Unexamined Patent Application Publication No. 3-67637
[Patent Document 2] Japanese Unexamined Patent Application Publication No. 2002-59486
[Patent Document 3] Japanese Unexamined Patent Application Publication No. 2009-234216
[Patent Document 4] Japanese Unexamined Patent Application Publication No. 2010-42669

SUMMARY OF THE INVENTION

Additional aspects and/or advantages of the invention will be set forth in part in the description which follows and, in part, will be obvious from the description, or may be learned by practice of the invention.

However, surface treatments, such as those described in Patent Documents 1 to 3 above make the production process more complicated and raise the production cost for the laminates such as those products. In addition, degradation of the elastomer layer possibly caused by the surface treatment may lead to deterioration in sealing efficiency of the laminate. The method of using only a particular fluorine elastomer, as described in Patent Document 4, makes it difficult to design the properties such as flexibility of the laminate arbitrarily according to applications of the laminate, because the kinds of the fluorine elastomers are limited.

Accordingly, the main object of the present invention is to provide a laminate having multiple elastomer layers tightly bonded to each other.

Specifically, the present invention relates to a laminate comprising an acrylic elastomer layer of an acrylic elastomer composition containing an onium salt as the acrylic elastomer-crosslinking agent (functional group) in an amount of 1 part or more with respect to 100 parts by weight of an epoxy group-containing acrylic elastomer and a fluorine elastomer layer of a fluorine elastomer composition containing a polyol crosslinking agent, which layers are bonded to each other.

The onium salt is preferably an organic ammonium salt and/or an organic phosphonium salt.

The present invention also provides a vulcanized product obtained by vulcanizing the laminate comprising an acrylic elastomer layer and a fluorine elastomer layer.

According to the present invention, a laminate having a fluorine elastomer layer and an acrylic elastomer layer tightly bonded to each other is provided.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a cross-sectional view illustrating an example of the laminate according to the present invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, the present invention will be described in detail, but it should be understood that the present invention is not limited by the embodiments described below.

FIG. 1 is a cross-sectional view illustrating an example of a laminate 1 according to the present invention. The laminate 1 has an acrylic elastomer layer 11 and a fluorine elastomer layer 12 and the acrylic elastomer layer 11 and the fluorine elastomer layer 12 are laminated and bonded to each other.

The acrylic elastomer layer 11 and the fluorine elastomer layer 12 may be simply bonded to each other, but preferably bonded with crosslinking, as the elastomers are crosslinked with each other at the interface. For example, it is possible to obtain a stronger laminate 1 by vulcanizing these layers, as laminated, into a vulcanized product. The vulcanization method used is not particularly limited and may be a common vulcanization method such as press vulcanization, steam vulcanization or electron beam vulcanization.

One or both of the acrylic elastomer layer 11 and the fluorine elastomer layer 12 may be surface-treated before vulcanization but it is possible according to the present invention to achieve strong vulcanization bonding property even without such a surface treatment. The numbers of the acrylic elastomer layers 11 and the fluorine elastomer layers 12 are also not particularly limited, and one, two or more acrylic elastomer layers 11 and one, two or more fluorine elastomer layers 12 may be laminated to give the laminate 1. When the numbers of the acrylic elastomer layers 11 and the fluorine elastomer layers 12 are each more than one, the acrylic elastomer layers 11 and the fluorine elastomer layers 12 can be laminated alternately. In addition, the laminate may have layers other than the acrylic elastomer layers 11 and the fluorine elastomer layers 12 and may have, for example, a structure comprising reinforcement fiber layers. The reinforcement fiber layer is bonded to one or both of the acrylic elastomer layer 11 and fluorine elastomer layer 12.

The acrylic elastomer layer 11 is prepared by molding an acrylic elastomer composition containing an acrylic elastomer as principal component and an onium salt into a layer shape (film shape), while the fluorine elastomer layer 12 is prepared by molding a fluorine elastomer composition containing a fluorine elastomer as principal component and a polyol crosslinking agent added into a layer shape (film shape). The "principal component" is a component having a content of 30 mass % or more in the composition, and thus, the acrylic elastomer composition contains an acrylic elastomer in an amount of 30 mass % or more and the fluorine elastomer composition, a fluorine elastomer in an amount of 30 mass % or more. Hereinafter, each composition will be described in more detail.

<Acrylic Elastomer Composition>

The acrylic elastomer for use in the present invention is a polymer comprising an alkyl (meth)acrylate ester as its principal component and an epoxy group-containing crosslinkable monomer copolymerized therewith. It is also possible, as needed, to use a copolymer of an alkyl (meth)acrylate ester with vinyl acetate, a crosslinkable monomer other than the epoxy group-containing crosslinkable monomer, ethylene or the like. The crosslinkable monomer is a monomer having a functional group forming a crosslinking site (crosslinking point).

The alkyl (meth)acrylate ester is a component forming the skeleton of the acrylic elastomer and it is possible by proper choice of its kind to adjust the normal-state physical properties and the basic properties, such as low-temperature resistance and oil resistance, of the acrylic elastomer composition obtained. In the present invention, similarly to the term (meth)acrylate, the alkyl (meth)acrylate ester is a concept including both an alkyl methacrylate ester and an alkyl acrylate ester.

Examples of the alkyl (meth)acrylate esters include, but are not limited to, alkyl (meth)acrylate esters such as methyl (meth)acrylate, ethyl (meth)acrylate, n-propyl (meth)acrylate, n-butyl (meth)acrylate, isobutyl (meth)acrylate, n-pentyl (meth)acrylate, isoamyl (meth)acrylate, n-hexyl (meth)acrylate, 2-methylpentyl (meth)acrylate, n-octyl (meth)acrylate, 2-ethylhexyl (meth)acrylate, n-decyl (meth)acrylate, n-dodecyl (meth)acrylate, and n-octadecyl (meth)acrylate.

Alternatively, alkoxyalkyl acrylate esters such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy)propyl acrylate can also be used, and these compounds can be used alone or in combination of two or more.

It is possible, by adjusting the blending rate of these unsaturated monomers, to adjust the low-temperature resistance and the oil resistance of the acrylic elastomer composition obtained and its vulcanized product. For example, it is possible to improve the low-temperature resistance by increasing the copolymerization rate of n-butyl acrylate and to improve the oil resistance by increasing the copolymerization rate of ethyl acrylate.

The crosslinkable monomer is a compound used for adjustment of the hardness and the elongation characteristics of the acrylic elastomer obtained, by promoting intermolecular crosslinking, as it is copolymerized as needed with the alkyl (meth)acrylate ester. The crosslinkable monomer for use is essentially an epoxy group-containing crosslinkable monomer and other crosslinkable monomers, such as those having active chlorine group, carboxyl group and the like can also be used as needed. It is also possible to use those having epoxy groups and other functional groups (carboxyl groups, for example).

The crosslinkable monomers are not particularly limited and examples of the epoxy group-containing crosslinkable monomers include glycidyl acrylate, glycidyl methacrylate, allyl glycidyl ether, methallyl glycidyl ether and the like. Examples of other crosslinkable monomers include active chlorine group-containing monomers such as 2-chloroethyl vinyl ether, 2-chloroethyl acrylate, vinylbenzyl chloride, vinyl chloroacetate, allyl chloroacetate; and carboxyl group-containing monomers such as acrylic acid, methacrylic acid, crotonic acid, 2-pentenoic acid, maleic acid, fumaric acid, itaconic acid, maleic acid monoalkyl esters, fumaric acid monoalkyl esters and cinnamic acid.

The additional amount of these crosslinkable monomers is preferably 0.5 to 10 parts by weight, more preferably 1 to 5 parts by weight and particularly preferably 1 to 4 parts by weight with respect to 100 parts by weight of the acrylic elastomer. An additional amount of the crosslinkable monomer at less than 0.5 parts by weight leads to deterioration in the action of crosslinking the acrylic elastomer composition and thus to insufficient strength of the vulcanized product obtained. An additional amount of the crosslinkable monomer at more than 10 parts by weight leads to hardening of the vulcanized product obtained and loss of rubber elasticity.

When only an epoxy group-containing crosslinkable monomer is used as the crosslinkable monomer, the addition amount of the crosslinkable monomer is the amount of the epoxy group-containing crosslinkable monomer added and, when an epoxy group-containing monomer and other crosslinkable monomers are used as crosslinkable monomer, it is the total amount of these monomers.

Vinyl acetate is a compound used for preservation of the mechanical properties, such as elongation, of the acrylic elastomer during heat aging of the acrylic elastomer by intermolecular crosslinking of the acrylic elastomer, and it is possible to control the intermolecular crosslinking of the obtained acrylic elastomer by properly adjusting the blending rate.

Acrylic elastomers lose their mechanical properties, such as tensile strength and elongation at break, rapidly under the influence of heat, ultraviolet ray or the like, as their main chain is cleaved. If vinyl acetate, which readily causes a crosslinking reaction, is copolymerized into the main chain of the acrylic elastomer, even when the main chain of the acrylic elastomer is cleaved, it is possible to crosslink the cleaved groups again by using the vinyl acetate as crosslinking sites.

When vinyl acetate is copolymerized, the copolymerization rate is preferably 20 parts by weight or less with respect to 100 parts by weight of the acrylic elastomer. When the copolymerization rate of the vinyl acetate is in the range above, it is possible to suppress deterioration in mechanical properties, while preserving the heat-aging resistance of the acrylic elastomer.

The acrylic elastomer can contain alkyl (meth)acrylate esters, crosslinkable monomers or other monomers copolymerizable with vinyl acetate, as they are copolymerized therein, in the range that does not impair the advantageous effect of the present invention. Examples of the other copolymerizable monomers include, but are not particularly limited to, alkyl vinyl ketones such as methyl vinyl ketone; vinyl and allyl ethers such as vinyl ethyl ether and allyl methyl ether; vinyl aromatic compounds such as styrene, $\alpha$-methyl styrene, chlorostyrene, vinyltoluene and vinylnaphthalene; vinyl nitriles such as acrylonitrile and methacrylonitrile; ethylenic unsaturated compounds such as acrylamide, propylene, butadiene, isoprene, pentadiene, vinyl chloride, vinylidene chloride, vinyl fluoride, vinylidene fluoride, ethylene and vinyl propionate.

In particular when the acrylic elastomer contains ethylene, as it is copolymerized, it is preferably used in an amount of 50 parts by weight or less with respect to 100 parts by weight of the acrylic elastomer. Copolymerization with ethylene provides an acrylic elastomer with drastically improved strength.

The acrylic elastomer is produced by copolymerization of the monomers, by a known method such as emulsion polymerization, suspension polymerization, solution polymerization or bulk polymerization. The acrylic elastomer composition includes the acrylic elastomer above and an onium salt. Examples of the onium salts include, but are not particularly limited to, organic ammonium salts, organic phosphonium salts and the like.

Examples of the organic ammonium salts for use in the present invention include, but are not particularly limited to, tetra-n-butylammonium chloride, trimethylphenylammonium chloride, trimethylstearylammonium chloride, trimethyllaurylammonium chloride, trimethylcetylammonium chloride, dimethyldistearylammonium chloride, tributylbenzylammonium chloride, tetra-n-butylammonium bromide, methyltriphenylammonium bromide, ethyltriphenylammonium bromide, trimethylphenylammonium bromide, trimethylbenzylammonium bromide, stearyltrimethylammonium bromide, tetrabutylammonium thiocyanate and the like.

Examples of the organic phosphonium salts for use in the present invention include, but are not particularly limited to, tetra-n-butylphosphonium chloride, tetra-n-butylphosphonium bromide, methyltriphenylphosphonium bromide, ethyltriphenylphosphonium bromide, butyltriphenylphosphonium bromide, hexyltriphenylphosphonium bromide, benzyltriphenylphosphonium bromide, tetraphenylphosphonium chloride, tetraphenylphosphonium bromide, 4-butoxybenzyltriphenylphosphonium bromide, allyltributylphosphonium chloride, 2-propynyltriphenylphosphonium bromide, methoxypropyltributylphosphonium chloride and the like.

These onium salts can be used alone or in combination of two or more. When sufficient bonding force, processability, flexibility and others are taken into consideration, the addition amount of the onium salt is preferably 1 to 10 parts by weight with respect to 100 parts by weight of the acrylic elastomer. An addition amount of the onium salt at less than 1 part by weight leads to insufficient bonding force of the laminate and thus to exfoliation. For more favorable vulcanization bonding effect, the addition amount of the onium salt is more preferably 2 to 10 parts by weight with respect to 100 parts by weight of the acrylic elastomer and it is possible to obtain needed and sufficient bonding efficiency at an addition amount of 2 parts by weight or more.

The method of adding the onium salt is not particularly limited but, for achieving strong vulcanization bonding property between the acrylic elastomer layer 11 and the fluorine elastomer layer 12 without any special surface treatment, it is preferable to use a method of adding the onium salt to the acrylic elastomer composition before vulcanization bonding of these layers, for example during kneading of the acrylic elastomer with various compounding ingredients.

The acrylic elastomer composition is prepared by kneading an acrylic elastomer, an onium salt and, as needed, other compounding ingredients such as crosslinking accelerators and fillers in a commonly-used rubber-kneading apparatus. Usable as the rubber-kneading apparatuses are rolls, kneaders, Banbury mixers, internal mixers, biaxial extruders and the like.

<Fluorine Elastomer Composition>

The fluorine elastomer used in the present invention is not particularly limited if it has fluorine atoms in the elastomer, and examples thereof include tetrafluoroethylene-ethylene copolymers, tetrafluoroethylene-propylene copolymers, chlorotrifluoroethylene-ethylene copolymers, polyvinylidene fluoride, polyvinyl fluoride, vinylidene fluoride-hexafluoropropylene copolymers, tetrafluoroethylene-vinylidene fluoride-hexafluoropropylene copolymers, tetrafluoroethylene-vinylidene fluoride-perfluoroalkylvinylether copolymers, tetrafluoroethylene-vinylidene fluoride-propylene copolymers, and the like.

The fluorine elastomer for use in the present invention is, for example, an elastomer permitting polyol crosslinking, although it is not particularly limited thereto.

The fluorine elastomer composition for use in the present invention includes the fluorine elastomer above and a polyol crosslinking agent blended additionally. A crosslinking accelerator can also be used in combination with the polyol crosslinking agent.

The polyol crosslinking agent and the crosslinking accelerator are the agents used for crosslinking the fluorine elastomer. The term "crosslinking" means that the same or different polymer chains of the fluorine elastomer are crosslinked with the polyol crosslinking agent, and the fluorine elastomer has improved tensile strength and more favorable elasticity by the crosslinking.

The crosslinked fluorine elastomer obtained by crosslinking with the polyol crosslinking agent has carbon-oxygen bonds at the crosslinking sites and thus, it is characteristic in its low compression set and favorable moldability and thus suitable as the laminate of the present invention.

The polyol crosslinking agent for use in the present invention may be a polyol-based compound generally known in application for fluorine elastomers and, for example, polyhydroxy compounds, especially polyhydroxy aromatic compounds, are used favorably, because they are superior in thermal resistance.

The polyhydroxy aromatic compound is not particularly limited in its kind, and examples thereof include resorcin, hydroquinone, catechol, 2,2-bis(4-hydroxyphenyl)propane, 2,2-bis(4-hydroxyphenyl)perfluoropropane, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, 2,2-bis(4-hydroxyphenyl)butane, 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, 3,3',5,5'-tetrabromobisphenol A and the like. These polyhydroxy aromatic compounds may be alkali-metal salts, alkali-earth metal salts or the like, but it is preferable not to use the metal salts above, if the copolymer of the fluorine elastomer is to be coagulated by using an acid.

In particular, polyhydroxy compounds are preferable among them, from the viewpoints of small compression set and favorable moldability of the crosslinked fluorine elastomer, and from the viewpoint of thermal resistance, polyhydroxy aromatic compounds are more favorable and 2,2-bis(4-hydroxyphenyl)perfluoropropane is furthermore favorable.

The additional amount of the polyol crosslinking agent is preferably 0.2 to 10 parts by weight, more preferably 0.5 to 3 parts by weight and still more preferably 1 to 2.5 parts by weight with respect to 100 parts by weight of the fluorine elastomer. An additional amount of the crosslinking agent at less than 0.2 part by weight leads to decrease of the effect of crosslinking the composition and thus to insufficient strength of the vulcanized product obtained. An additional amount of the crosslinking agent at more than 10 parts by weight leads to hardening and loss of rubber elasticity of the vulcanized product obtained.

In addition, a crosslinking accelerator is preferably used in combination with the polyol crosslinking agent during the polyol-induced crosslinking. The crosslinking accelerator, when used, accelerates the crosslinking reaction by facilitating intramolecular double bond formation by dehydrofluorination reaction of the fluorine elastomer main chain.

The crosslinking accelerator used during the polyol-induced crosslinking is preferably a compound that is resistant to addition to the main chain of the fluorine elastomer. Generally, an onium compound is used. Examples of the onium compounds include, but are not particularly limited to, ammonium compounds such as quaternary ammonium salts, phosphonium compounds such as quaternary phosphonium salts, oxonium compounds, sulfonium compounds, cyclic amines, monofunctional amine compounds and the like and, in particular, onium salts such as quaternary ammonium salts and quaternary phosphonium salts are preferable among them.

The onium salt used as crosslinking accelerator is not particularly limited in kind, and those identical in kind with those used in the acrylic elastomer composition can be used. The method of adding the onium salt is not particularly limited, but it is possible to achieve a strong vulcanization bonding property by using a method of adding it before vulcanization bonding of the fluorine elastomer layer and the acrylic elastomer layer, for example during kneading of the fluorine elastomer with various compounding ingredients and others.

The additional amount of the crosslinking accelerator is preferably 0.1 to 2.0 parts by weight, more preferably 0.1 to 1.5 parts by weight and still more preferably 0.1 to 0.7 part by weight with respect to 100 parts by weight of the fluorine elastomer. An additional amount of the crosslinking accelerator at less than 0.1 part by weight prohibits the desired crosslinking-accelerating effect, while an additional amount of more than 2.0 parts by weight leads to excessively high crosslinking velocity, easily causing scorching (earlier vulcanization before vulcanizing step) and molding defects.

In addition, common additives for fluorine elastomers, specifically various additives such as carbon black, reinforcing agents, softeners, aging inhibitors, vulcanizing agents, vulcanizing accelerators, fillers, processing aids, plasticizers, colorants, stabilizers, bonding aids, acid acceptors, release agents, conductivity enhancers, heat conductivity enhancers, surface-nonadhesiveness agents, softeners, thermal resistance improvers and flame retardants can be blended, as needed. One or more crosslinking agents other than the polyol crosslinking agent and one or more crosslinking accelerators can be blended.

The fluorine elastomer composition is prepared by kneading a fluorine elastomer, a polyol crosslinking agent and, as needed, other compounding ingredients such as crosslinking accelerators and fillers in a commonly-used rubber-kneading apparatus. Usable as the rubber kneading apparatuses are rolls, kneaders. Banbury mixers, internal mixers, biaxial extruders and the like.

EXAMPLES

Hereinafter, the present invention will be described in more detail with reference to Examples, but it should be understood that the present invention is not restricted by these Examples.

Four kinds of acrylic elastomers A to D were prepared under the conditions shown below.

<Preparation of Acrylic Elastomer A>

17 kg of 4 mass % aqueous solution of partially saponified polyvinylalcohol and 22 g of sodium acetate were placed in a reaction container having an internal capacity of 40 liters and the mixture was agitated thoroughly with a stirrer in advance, to give a homogeneous suspension solution. After the air in the upper region of the tank was substituted with nitrogen, agitation was continued. After the temperature inside the tank was kept at 55° C., monomer components (5.5 kg of ethyl acrylate, 5.5 kg of n-butyl acrylate and 0.15 kg of glycidyl methacrylate) and 2 kg of 0.5 mass % aqueous solution of t-butyl hydroperoxide were added separately through injection ports, to initiate polymerization. The temperature in the tank was kept at 55° C. during the reaction and the reaction was terminated after 6 hours, to give a polymer solution.

20 kg of 0.3 mass % aqueous solution of sodium borate was added to the polymer solution obtained and the polymer was solidified, dehydrated, and dried, to give an acrylic elastomer A. The acrylic elastomer A had a copolymer composition of 1.3 parts by weight of glycidyl methacrylate monomer units, 50 parts by weight of ethyl acrylate monomer units, and 50 parts by weight of n-butyl acrylate monomer units. The amount of the glycidyl methacrylate monomer was determined quantitatively by titration using a perchloric acid/acetic acid solution after dissolving the crude rubber of the copolymer (before vulcanization bonding) in chloroform. The amounts of other monomer unit components were each determined quantitatively by a nuclear magnetic resonance spectroscopic method.

<Preparation of Acrylic Elastomer B>

An acrylic elastomer B was prepared under conditions identical with those for the acrylic elastomer A, except that the composition of the monomer components, raw materials for the acrylic elastomer, was changed to 2.2 kg of vinyl acetate, 8.8 kg of n-butyl acrylate and 17 kg of glycidyl methacrylate.

The acrylic elastomer B had a copolymer composition of 20 parts by weight of vinyl acetate monomer units, 80 parts by weight of n-butyl acrylate monomer units and 1.5 parts by weight of glycidyl methacrylate monomer units. The method of determining the amount of glycidyl methacrylate monomer quantitatively and the method of determining the amount of other monomer unit components quantitatively in the acrylic elastomer B and also in the acrylic elastomers C and D described below are the same as those described for the acrylic elastomer A.

<Preparation of Acrylic Elastomer C>

17 kg of 4 mass % aqueous solution of partially saponified polyvinylalcohol and 22 g of sodium acetate were placed in a reaction container having an internal capacity of 40 liters and the mixture was agitated thoroughly with a stirrer in advance, to give a homogeneous suspension solution. After the air in the upper region of the tank was substituted with nitrogen, ethylene was fed under pressure to the upper region of the tank to adjust the pressure to 35 kg/cm². After agitation was continued and the temperature in the tank was kept at 55° C., monomer components (ethyl acrylate 5.5 kg, n-butyl acrylate 5.5 kg, glycidyl methacrylate 0.15 kg) and 2 kg of 0.5 mass % aqueous solution of t-butyl hydroperoxide were added separately through injection ports, to initiate polymerization. The temperature in the tank was kept at 55° C. during the reaction and the reaction was terminated after 6 hours, to give a polymer solution.

20 kg of 0.3 mass % aqueous solution of sodium borate was added to the polymer solution obtained and the polymer was solidified, dehydrated, and dried, to give an acrylic elastomer C. The acrylic elastomer C had a copolymer composition of 1.3 parts by weight of glycidyl methacrylate monomer units, 50 parts by weight of ethyl acrylate monomer units, 47 parts by weight of n-butyl acrylate monomer units, and 3 parts by weight of ethylene monomer units.

An acrylic elastomer D was prepared under the condition identical with that for the acrylic elastomer A, except that the composition of the monomer components, raw materials for the acrylic elastomer, was changed to 5.5 kg of ethyl acrylate and 5.5 kg of n-butyl acrylate. The acrylic elastomer D had a copolymer composition of 50 parts by weight of ethyl acrylate monomer units and 50 parts by weight of n-butyl acrylate monomer units.

<Preparation of Laminate>

A fluorine elastomer composition was prepared at the composition (weight ratio) shown in the following Table 1 and the fluorine elastomer composition (unvulcanized) was molded into a fluorine elastomer layer having a thickness of 2.5 mm.

TABLE 1

| Blending rate of fluorine elastomer composition | |
|---|---|
| Fluorine elastomer | 100 |
| Carbon SRF | 13 |
| Magnesium oxide | 3 |
| Calcium hydroxide | 6 |

The acrylic elastomers A to D and other materials were kneaded at the blending rates (weight ratios) shown in the following Tables 2 to 4 by using an 8-inch open roll, to give acrylic elastomer compositions of Examples 1 to 20 and Comparative Examples 1 to 7. Each of these acrylic elastomer compositions (unvulcanized) was molded into an acrylic elastomer layer having a thickness of 2.5 mm, bonded to the fluorine elastomer layer, and heat-treated with a steam-heating-type heat press at 160° C. 35 minutes, to give a vulcanized product of the laminate.

TABLE 2

Acrylic elastomer compositions and test results (1)

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Acrylic elastomer A | 100 | 100 | 100 | 100 | 100 | 100 | 100 | 100 | — | — |
| Acrylic elastomer B | — | — | — | — | — | — | — | — | 100 | 100 |
| Acrylic elastomer C | — | — | — | — | — | — | — | — | — | — |
| Acrylic elastomer D | — | — | — | — | — | — | — | — | — | — |
| Stearic acid | 1 | 1 | 1 | 1 | 1 | 1 | 1 | 1 | 1 | 1 |
| Aging inhibitor | 1 | 1 | 1 | 1 | 1 | 1 | 1 | 1 | 1 | 1 |
| Carbon HAF | 55 | 55 | 55 | 55 | 55 | 55 | 55 | 55 | 55 | 55 |
| Stearyltrimethylammonium bromide | 1 | 2 | 4 | 6 | 10 | — | — | — | 2 | 4 |
| Tetra-n-butylammonium thio cyanate | — | — | — | — | — | 2 | — | — | — | — |
| Tetra-n-butylammonium chloride | — | — | — | — | — | — | 2 | — | — | — |
| Benzyltributylammonium chloride | — | — | — | — | — | — | — | 2 | — | — |
| Tetra-n-butylphosphonium bromide | — | — | — | — | — | — | — | — | — | — |
| Methyltriphenylphosphonium bromide | — | — | — | — | — | — | — | — | — | — |
| Ethyltriphenylphosphonium bromide | — | — | — | — | — | — | — | — | — | — |
| Vulcanizing condition | 160° C. 35 min. | 160° C. 35 min. | 160° C. 35 min. | 160° C. 35 min. | 160° C. 35 min. | 160° C. 35 min. | 160° C. 35 min. | 160° C. 35 min. | 160° C. 35 min. | 160° C. 35 min. |
| Bonding test results — Exfoliation Mode | Δ | ○ | ○ | ○ | ○ | ○ | ○ | ○ | ○ | ○ |

<Preparation of Acrylic Elastomer D>

TABLE 3

Acrylic elastomer compositions and test results (2)

| | Example 11 | Example 12 | Example 13 | Example 14 | Example 15 | Example 16 | Example 17 | Example 18 | Example 19 | Example 20 |
|---|---|---|---|---|---|---|---|---|---|---|
| Acrylic elastomer A | 100 | 100 | 100 | 100 | 100 | 100 | — | — | — | — |
| Acrylic elastomer B | — | — | — | — | — | — | 100 | 100 | 100 | — |
| Acrylic elastomer C | — | — | — | — | — | — | — | — | — | 100 |
| Acrylic elastomer D | — | — | — | — | — | — | — | — | — | — |
| Stearic acid | 1 | 1 | 1 | 1 | 1 | 1 | 1 | 1 | 1 | 1 |
| Aging inhibitor | 1 | 1 | 1 | 1 | 1 | 1 | 1 | 1 | 1 | 1 |
| Carbon HAF | 55 | 55 | 55 | 55 | 55 | 55 | 55 | 55 | 55 | 55 |
| Stearyltrimethylammonium bromide | — | — | — | — | — | — | — | — | — | 2 |
| Tetra-n-butylammonium thio cyanate | — | — | — | — | — | — | — | — | — | — |
| Tetra-n-butylammonium chloride | — | — | — | — | — | — | — | — | — | — |
| Benzyltributylammonium chloride | — | — | — | — | — | — | — | — | — | — |
| Tetra-n-butylphosphonium bromide | 1 | 2 | 4 | 10 | — | — | 2 | — | — | — |
| Methyltriphenylphosphonium bromide | — | — | — | — | 2 | — | — | 2 | — | — |
| Ethyltriphenylphosphonium bromide | — | — | — | — | — | 2 | — | — | 2 | — |
| Vulcanizing condition | 160° C. 35 min. | 160° C. 35 min. | 160° C. 35 min. | 160° C. 35 min. | 160° C. 35 min. | 160° C. 35 min. | 160° C. 35 min. | 160° C. 35 min. | 160° C. 35 min. | 160° C. 35 min. |
| Bonding test results  Exfoliation Mode | Δ | ○ | ○ | ○ | ○ | ○ | ○ | ○ | ○ | ○ |

TABLE 4

Acrylic elastomer compositions and test results (3)

| | Example 21 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Acrylic elastomer A | — | 100 | — | 100 | 100 | — | — | — |
| Acrylic elastomer B | — | — | 100 | — | — | — | — | — |
| Acrylic elastomer C | 100 | — | — | — | — | — | — | — |
| Acrylic elastomer D | — | — | — | — | — | 100 | 100 | 100 |
| Stearic acid | 1 | 1 | 1 | 1 | 1 | 1 | 1 | 1 |
| Aging inhibitor | 1 | 1 | 1 | 1 | 1 | 1 | 1 | 1 |
| Carbon HAF | 55 | 55 | 55 | 55 | 55 | 55 | 55 | 55 |
| Stearyltrimethylammonium bromide | 4 | — | — | 0.5 | — | — | 1 | 5 |
| Tetra-n-butylammonium thio cyanate | — | — | — | — | — | — | — | — |
| Tetra-n-butylammonium chloride | — | — | — | — | — | — | — | — |
| Benzyltributylammonium chloride | — | — | — | — | — | — | — | — |
| Tetra-n-butylphosphonium bromide | — | — | — | — | 0.5 | — | — | — |
| Methyltriphenylphosphonium bromide | — | — | — | — | — | — | — | — |
| Ethyltriphenylphosphonium bromide | — | — | — | — | — | — | — | — |
| Vulcanizing condition | 160° C. 35 min. | 160° C. 35 min. | 160° C. 35 min | 160° C. 35 min. | 160° C. 35 min. | 160° C. 35 min. | 160° C. 35 min. | 160° C. 35 min. |
| Bonding test results  Exfoliation Mode | ○ | X | X | X | X | X | X | X |

The compounding ingredients described in Tables 1 to 4 are as follows:

Fluorine elastomer: DAI-EL G558 (produced by Daikin Industries, Ltd., containing a polyol crosslinking agent in the product)

Magnesium oxide: Kyowamag 150 (produced by Kyowa Chemical Industry Co., Ltd.)

Calcium hydroxide: analytical grade reagent (produced by Wako Pure Chemical Industries, Ltd.)

Carbon SRF: Asahi #50 (produced by Asahi Carbon Co., Ltd.)

Carbon HAF: SEAST #3 (produced by Tokai Carbon Co., Ltd.)

Aging inhibitor: NOCRAC CD (produced by Ouchi Shinko Chemical Industrial Co., Ltd.)

Stearic acid: LUNAC S-90 (produced by Kao Corp.)

Stearyl trimethylammonium bromide: analytical grade reagent (produced by Wako Pure Chemical Industries, Ltd.)

Tetra-n-butylammonium thio cyanate: analytical grade reagent (produced by Wako Pure Chemical Industries, Ltd.)

Tetra-n-butylammonium chloride: analytical grade reagent (produced by Wako Pure Chemical Industries, Ltd.)

Benzyltributylammonium chloride: analytical grade reagent (produced by Wako Pure Chemical Industries, Ltd.)

Tetra-n-butylphosphonium bromide: analytical grade reagent (produced by Wako Pure Chemical Industries, Ltd.)

Methyltriphenylphosphonium bromide: analytical grade reagent (produced by Wako Pure Chemical Industries, Ltd.)

Ethyltriphenylphosphonium bromide: analytical grade reagent (produced by Wako Pure Chemical Industries, Ltd.)

The peel strength of each of the vulcanized products (test pieces) of the laminates obtained was evaluated under the following condition.

(1) Peel Strength

The peel strength, i.e., the bonding strength, was determined, as each test piece was subjected to a peel test, T, in a tensile tester at a peeling rate of 50 mm/minute. The exfoliation mode was observed and evaluated according to the following criteria:

(Exfoliation Mode)

◯: The material was broken.

Δ: Part of the material was broken.

X: The material was separated at the interface.

The evaluation results are summarized in Tables 2 to 4.

As is obvious from Tables 2 to 4, the laminates according to the present invention have high bonding strength between the fluorine elastomer layer and the acrylic elastomer layer even without any special surface treatment, because they have high vulcanization-derived bonding strength. As obvious from comparison between Examples 1 to 10 and Examples 11 to 21, any onium salt, organic ammonium salt or organic phosphonium salt, is suitable for the present invention.

In addition, the bonding strengths of the laminates of Comparative Examples 6 and 7 are lower, although the acrylic elastomer compositions contain an onium salt, indicating that, for assurance of high bonding strength, there should be epoxy groups (glycidyl groups) contained in the chemical structure of the acrylic elastomer.

INDUSTRIAL APPLICABILITY

The laminate according to the present invention gives a composition superior in interlayer bonding strength and the laminate and the vulcanized product thereof can be used favorably as hose parts, sealing parts, and antivibration rubber parts.

REFERENCE SIGNS LIST

1: Laminate
11: Acrylic elastomer layer
12: Fluorine elastomer layer Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A laminate, comprising:
   an acrylic elastomer layer of an acrylic elastomer composition containing at least one kind selected from the group consisting of organic ammonium chloride, organic ammonium bromide, tetrabutylammonium thiocyanate, organic phosphonium chloride and organic phosphonium bromide in an amount of 2 to 10 parts by weight with respect to 100 parts by weight of an epoxy group-containing acrylic elastomer: and
   a fluorine elastomer layer of a fluorine elastomer composition containing a polyol crosslinking agent, the acrylic elastomer layer and the fluorine elastomer layer being bonded to each other.

2. A vulcanized product obtained by vulcanizing the laminate according to claim 1.

* * * * *